United States Patent Office 3,545,829
Patented Dec. 8, 1970

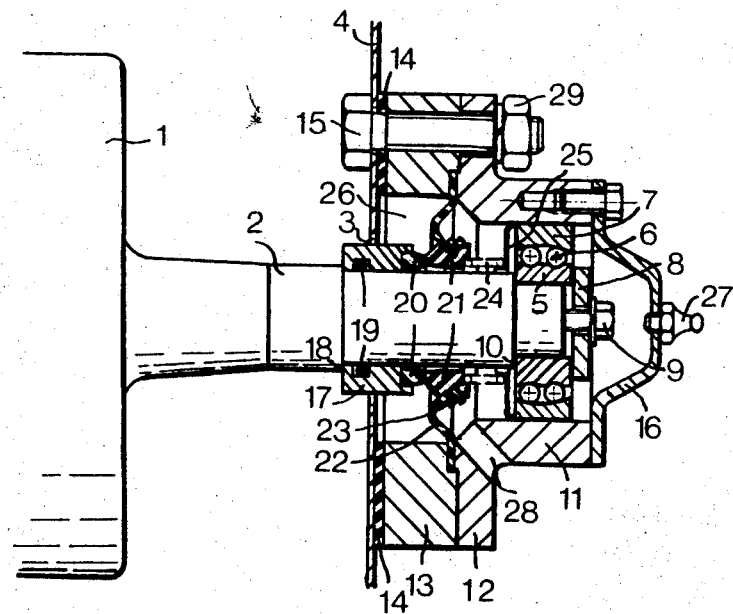

3,545,829
SUPPORT BEARING FOR A ROLLER ROTATING IN A LIQUID CONTAINING RECEPTACLE
Oskar Stoll, Niederuzwil, and Willi Probst, Uzwil, Switzerland, assignors to Maschinenfabrik Benninger AG, Uzwil, Switzerland, a corporation of Switzerland
Filed Sept. 23, 1968, Ser. No. 761,418
Claims priority, application Switzerland, Sept. 26, 1967, 13,474/67
Int. Cl. F16c *33/78*
U.S. Cl. 308—187.1           7 Claims

ABSTRACT OF THE DISCLOSURE

A support bearing for a roller rotating in a liquid containing receptacle is disclosed, the support bearing being provided with shaft stubs or journals which extend through openings in the receptacle wall. A bearing member as well as sealing members therefor are provided on each side of the rotating roller mounted outside of the receptacle within a cup attached to the receptacle. The sealing members for each support bearing comprise a rotating and a stationary sealing ring, the rotating sealing ring being disposed on the shaft stub of the roller and being rotatable therewith. The stationary sealing ring is supported by a ring diaphragm or membrane. The frictional sealing surface of the stationary sealing ring is pressed against the associated sealing surface of the rotating sealing ring by a spring support ring also mounted outside of the receptacle within the cup. With the inventive embodiment, the position of both the rotating and stationary sealing rings is each determined exclusively by the position of the shaft stub and thus, the sealing function of the support bearing cannot adversely be affected by deformations in the roller or shaft stub, flexures of the receptable wall or the like, the stationary sealing ring always remaining in the same relative position with respect to the rotating sealing ring, changes in actual position of the stationary sealing ring being absorbed by the flexible ring diaphragm or membrane.

BACKGROUND OF THE INVENTION

This invention generally relates to support bearings and particularly concerns a novel support bearing for a roller adapted to rotate in a liquid containing receptacle.

In the treatment of textile material and particularly of textile webs through the utilization of liquids as takes place in dying, bleaching, washing and the like, the textile material to be treated is passed over rollers which are immersed in the treating liquid. The treating or treatment liquid is contained in tanks such as the so-called dye-liquor troughs. Since, in many instances, the treatment liquid is chemically very active and moreover is often heated to a boiling temperature, the support bearings for the rollers which are immersed in the liquid are adversely affected and thus cause considerable difficulties in actual practice. Support bearings for these rollers have been developed in the prior art, these known support bearings generally being cube-shaped and which may, for example, be constructed of carbon or plastic material. These known cube-shaped supported bearings are mounted on shaft stubs or journals disposed on both sides of the roller, the support bearings having suitable bores therein for receiving the shaft stub or journal. These known support bearings are mounted on the inside surface of the side walls of the liquid containing receptacle. A major disadvantage of this known construction is that such support bearings cannot be adjusted during operation to accommodate the deformation or bending of the roller assembly caused by the tension of the textile material which passes over the roller in the liquid containing receptacle. As a consequence, the prior-art support bearings of this construction are worn out in a rounded or convex manner and within a relatively short period of time thus requiring frequent replacement since the resulting unbalanced running and impact of the rollers caused by the worn support bearings has a deleterious effect upon the processing of the textile goods.

In an attempt to avoid this particular drawback, the prior art evolved wherein the cube-shaped support bearings were replaced by ball-shaped support bearings. Although this replacement resulted in a support bearing which was able to follow the roller assembly deformation and bending during operation thereof, the service life of these ball-shaped support bearings as was still uneconomically short and the replacement thereof was still very cumbersome. Oftentimes when utilizing the prior-art ball-shaped support bearings, it was necessary to disassemble essential and major parts of the entire processing machine so as to remove the rollers and replace their support bearings within the receptacle.

Further, when considering prior-art support bearing constructions, the roller support bearings can only be inspected when the textile processing apparatus is not in operation and such inspection itself is a cumbersome, tedious process. If the inspection is carelessly undertaken or insufficiently handled, it may occur that the textile processing apparatus, in the middle of the work process, must be rendered inoperative, the liquid in the receptacle tank must be discharged, and lengthy and expensive repairs must be undertaken at this time.

The rapid wear of support bearings of prior-art constructions is a drawback which is common to all friction bearings which are mounted within the inside of the liquid-containing receptacle. This major drawback is probably brought about by the fact that the liquid within the receptacle flowing around the support bearing is hot and/or chemically active. Furthermore, the textile fiber residues floating in the liquid in the receptacle which enters the bearing bore as well as the calcium deposited on the support bearing increase the bearing friction and thus greatly accelerate the wear of the bearing.

In accordance with yet another prior-art support bearing construction, the support bearings are mounted outside of the liquid receptacle and the shaft stubs or journals for the rollers are supported within frictionless roller bearings. With this construction, the drawbacks and disadvantages associated with support bearings mounted within the liquid-containing receptacle were sought to be obviated. It is, of course, necessary in connection with accomplishing this purpose that openings be provided in the receptacle walls for the through-passage of the shaft stubs or journals along with suitable sealing means which will prevent the discharge of the receptacle liquids between rotating and non-rotating parts of the shaft stub and support bearing assembly at the outlet point on the receptacle wall.

With one known prior-art construction of this type, the liquid-containing area is sealed off against the housing of the roller or ball-bearing by primary and secondary sealing means, wherein planar seals in the form of sliding rings serve as these primary sealing means, one of the sliding rings being stationarily mounted at the outside wall of the receptacle, the other of the sliding rings being rotatably coupled with the shaft but in a manner wherein the sliding ring is able to slide on the shaft so as to be pressed by a spring against the sealing surface of the stationary sliding ring. With this construction, the secondary sealing means are formed by an O-ring between the shaft sub and/or journal and the sliding ring rotating with the same.

This known arrangement has the disadvantage or drawback that changes in the position of the roller occurring particularly when the roller deforms or bends through during operation but also due to thermal expansions of the roller or the receptacle such as bellying or deformation of the receptacle wall cause undesirable relative movements of the sealing means as a result thereof. During these relative movements, the adhesive force of the two sliding rings changes and/or the secondary sealing means becomes leaky as a result of these continual displacements. The latter case occurs particularly in those instances wherein, during bath changes or long periods of inoperativeness, calcium and/or solid particles from the treatment liquid deposit on the shaft stub or journals. As a result of such deposition, the sliding sealing rings can only adjust with great difficulty to the movements of the roller or the bellying or bulging of the receptacle walls. Consequently, an uneconomically high leakage loss of receptacle liquid occurs. Lastly, the sealing means in this known construction require precision mounting which, in turn, renders both the mounting and the required maintenance more difficult.

SUMMARY OF THE INVENTION

Thus, a need exists in the art for a support bearing for a roller rotating in a liquid-containing receptacle that eliminates the disadvantages and drawbacks of prior-art constructions as discussed. It is a primary object of the instant invention to satisfy this need.

Other equally important, though more specific objects of the subject invention are as follows:

(a) The provision of a support bearing for a roller rotating in a liquid-containing receptacle which eliminates the problem of leakage from the receptacle;

(b) The provision of a support bearing for a roller rotating in a liquid-containing receptacle which exhibits relatively little wear thus offering greater life;

(c) The provision of a support bearing for a roller rotating in a liquid-containing receptacle wherein the roller bend-through or deformation during operation as well as the thermal expansion of the roller or the receptacle have little or no effect on the maintenance of a good seal;

(d) The provision of a support bearing for a roller rotating in a liquid-containing receptacle requiring a minimum of manufacturing tolerances;

(e) The provision of a support bearing for a roller rotating in a liquid-containing receptacle of relatively simple construction requiring relatively fewer parts;

(f) The provision of a support bearing for a roller rotating in a liquid-containing receptacle offering ease of maintenance and repair;

(g) The provision of a support bearing for a roller rotating in a liquid-containing receptacle wherein inspection and adjustment of the same can be performed without necessitating major disassembly of the textile treating apparatus.

These objects as well as other objects and advantages which will become apparent as the description proceeds are implemented by the inventive support bearing for a roller rotating in a liquid-containing receptacle. The roller is provided with shaft stubs or journals which extend through openings in the receptacle wall and the bearing members as well as the sealing members which comprise one stationary and one rotating sealing ring, the latter rotating with the shaft stub, are mounted outside of the liquid-containing receptacle within a cup attached to the receptacle. The disadvantages and drawbacks of the above-discussed prior-art support bearing constructions are obviated with the inventive embodiment in that the stationary sealing ring on the side of the bearing member which faces the receptacle is centered relative to the shaft stub with its tightly frictioning or frictional sealing surface disposed towards the receptacle. The stationary sealing ring is pressed against the associated sealing surface of the rotating sealing ring immovably disposed on the shaft stub and sealed off against the latter. The closure between the stationary sealing ring and the wall of the cup toward the bearing member is formed by a flexible membrane or diaphragm.

With the subject inventive configuration, the position of both the rotating and the stationary sealing rings which form the primary sealing means is determined exclusively by the shaft stub. As was previously the case, the position of one ring was determined by the shaft stub and the position of the other sealing ring was determined by the bearing cup. Accordingly, with the subject inventive embodiment, the respective positions of both sealing rings in relation to each other and thus the sealing effect achieved by the tightly frictioning or frictional surfaces of these two rings can neither be changed nor impaired by bulgings or deformations of the receptacle which causes an approximately axial displacement of the bearing cup relative to the shaft stub or by deformations or bend-through of the roller which causes an inclination of the shaft stub relative to the bearing cup. Thus, the stationary sealing ring always remains in the same position relative to the rotating sealing ring and changes in position of the stationary sealing ring relative to the bearing cup are absorbed in a tensionless manner by the flexible diaphragm or membrane.

BRIEF DESCRIPTION OF THE DRAWING

Additional advantages and features of the subject invention will become apparent and the invention itself will be better understood from the following detailed description of a preferred embodiment thereof, such detailed description making reference to the appended drawing, the sole figure of which depicts an axial cross-section of one embodiment of the subject invention taken through one end of a trough roller with its bearing in the side wall of the trough or receptacle.

DETAILED DESCRIPTION OF A PREFERRED EMBODIMENT

Referring now to the drawing, a roller designated 1 has, at both ends thereof, a shaft stub or journal 2 which penetrates through an opening 3 in a side wall 4 of a trough or liquid-containing receptacle. Outside of the trough or receptacle, the shaft stub or journal 2 bears at one end thereof on an inside ball race 5 of a ball bearing 6, the outside ball race of the ball bearing 6 being identified by reference numeral 7. Ball bearing 6 is secured on the shaft stub or journal 2 between a shoulder 10 thereof and a disc 8 which, in turn, is secured by a bolt 9 screwed into an axial bore of the front end of the shaft stub 2. A housing 11 is slid onto the outside ball race 7 of the ball bearing 6, the housing having a flange member 12 disposed toward the side of the receptacle. Flange member 12 is attached to the outside of receptacle 4 and is removable therefrom by means of a bolt 15 having an intermediate centering ring 13 and a sealing ring 14. Housing 11 is closed off by a screwed-on lid or cap 16 in the extension of shaft stub 2.

A support ring 17 is disposed on shaft stub 2 and rotates with the same. Support ring 17 is located in the area of opening 3 through the receptacle wall 4, the support ring 17 abutting in the direction of roller 1 on a shoulder 18 of the shaft stub 2. The passage of liquid from the receptacle along the shaft stub 2 and between the shaft stub and the support ring 17 is prevented by an O-ring 19 disposed in an inside ring groove of the support ring 17.

One sliding ring 20 of a pair of sliding rings is secured to the front wall of the support ring 17 on the outside of the receptacle, sliding ring 20 preventing in a manner to be described below the passage of liquid from the receptacle into the housing 11 containing the ball bearing 6. The second sliding ring of the pair of sliding rings is designated by reference numeral 21 and cooperates with the rotating sliding ring 20 in a planar sealing fashion. Second ring 21 is stationary and encircles the shaft stub 2 at a distance. The second ring is secured in this position by being freely suspended in a ring membrane or diaphragm 22 the opening of which being tightly closed off in that the inside rim of the membrane 22 is clamped into a suitable recess in the circumference of sliding ring 21 by means of a clamping ring 23. The outside rim of the ring membrane or diaphragm 22 is clamped between the centering ring 13 and the flange 12 of the housing 11. The sealing surfaces of both sliding rings 20 and 21 are pressed against each other by means of a helical compression spring 24 likewise encircling the shaft stub 2 at a distance, one end of which being centered in a groove in the front surface of the stationary sliding ring 21. The last threading or convolution of the other end of the screw spring is supported on a collar of a spring support ring 25. The spring support ring 25 is formed as a sheet metal ring encircling the shaft stub 2 at a distance and is centered in housing 11 adjoining the front surface of ball bearing 6 on the sides of the receptacle.

As can readily be appreciated, with the inventive bearing as depicted in the drawing, the liquid contained in the receptacle or trough can leave between the circumference of support ring 17 and the inside rim of the outlet opening 3 for the shaft stub 2. However, any liquid leaving the receptacle in this manner reaches a closed ring chamber 26 which is delimited by the outside surface of receptacle wall 4, the inside surface of centering ring 13, ring member 22, both sliding rings 20 and 21, and the outside surface of the support ring 17. Since the position of the stationary sliding ring 21 is directly and exclusively determined by the position of the shaft stub via compression spring 24, ring 25, and the ball bearing 6, no relative tilting or canting of the two sealing rings 20 or 21 can occur either as a result of roller deformation or bending or as a result of thermal expansion of the roller and/or receptacle, or of both conditions combined. As will be recalled, this operation is in direct contrast to the known constructions as described in the introduction to the specification.

The pressing of sliding ring 21 against the sliding ring 20 by means of the spring 24 occurs independently of any such variations discussed above occasioned during operation, and the pressing of the sliding rings against each other always occurs uniformly and with constant force. The intermediate insertion of the flexible membrane or diaphragm 22 between the stationary portion of the bearing and the stationary sliding ring 21 offers the further advantage that the entire support bearing need not be divided into a stationary and a movable bearing. Manufacturing tolerances and maximal trough bulging need to be taken into consideration solely with respect to the distances between the outside front surface of the ball bearing 6 and the lid 16. This is possible for the reason that the force of the compression spring 24 always remains constant and further, displacements of the ball bearing 6 toward the clamping point of the diaphragm 22 has no influence.

As should be appreciated, the inventive support bearing as described is further characterized by its simple construction which requires relatively fewer parts and, moreover, which can be quite simply manufactured as compared with support bearings of similar type known in the prior-art. The support bearing of the subject invention is particularly advantageous due to its construction with respect to the maintenance and repair thereof.

A nipple 27 is disposed in lid or cap 16 so that ball bearing 6 can be lubricated through the nipple. Excess lubricant can flow off through an opening 28 in the area between the ball bearing 6 and the diaphragm or membrane 22. Any liquid from the receptacle leaking through the sealing means can also flow off through the same opening 28. To inspect the ball bearing 6, only the cap 16 must be removed. If the inspection indicates that the ball bearing 6 must be replaced, then housing 11 can be drawn off after first removing nut 29 which then affords access to the interior parts of the support bearing and the sealing members. All inspection and adjustment work can now be easily performed without necessitating any disassembly in the interior of the receptacle and without necessitating the removal of any textile material in the receptacle or trough.

When the housing 11 is removed the shaft stub 2 rests on the rim of opening 3 in the receptacle on the support ring 17. The tilting movement of roller 1 is minimal in this regard and corresponds to the short distance between the circumference of the support ring 17 and the inside rim of opening 3. In any case, this slight angular change in the position of roller 1 occasioned upon the removal of housing 11 on one side thereof, does not cause any additional loading upon the opposite roller bearing of the came construction since such inclinations are easily absorbed, on the one end, by bearing 6 which is in the form of a self-aligning ball bearing and, on the other hand, by the flexible membrane or diaphragm 22. During reassembly of the housing 11, after the necessary adjustment or repair work has been performed, the shaft stub 2 and thus the roller 1 are automatically brought back again into their correct position by means of the centering ring 13.

As a further advantage of the inventive support bearing as described, it should be mentioned that the secondary sealing means formed by the O-ring 19 between the support ring 17 and the shaft stub 2 is not subjected to wear since no relative movement of the shaft stub 2 and the support ring 17 occurs during operation. O-ring 19 offers the further advantage that it facilitates the drawing off or removal of the support ring 17 from the shaft stub 2 as may become necessary, for example, if the rotating sliding ring 20 must be replaced.

As should now be apparent, the objects initially set forth at the outset of this specification have now been successfully achieved. Accordingly,

What is claimed is:

1. A support bearing on a liquid-containing receptacle, shaft stubs or journals extending through openings in the wall of said receptacle, said support bearing comprising: bearing means for journalling the end of the shaft stub; sealing means comprising two adjacent sealing rings disposed about the shaft stub, each sealing ring having a cooperating sealing surface, one of said sealing rings being stationary and the other rotatable with the shaft stub; cup-like housing means secured to the receptacle for housing said bearing means and said sealing means externally of the receptacle; said sealing means being disposed between the receptacle and said bearing means with said stationary sealing ring being disposed between said rotatable sealing ring and said bearing means; means for centerinig said stationary sealing ring relative to the shaft stub; means for pressing said stationary sealing ring and its sealing surface against the associated cooperating sealing surface of said rotatable sealing ring; means for fixedly mounting said rotatable sealing ring on the shaft stub for rotation therewith and for sealing said rotatable sealing ring off against the shaft stub; and a flexible diaphragm means defining a closure between said stationary sealing ring and an inside wall of said cup-like housing means containing said bearing means, said flexible diaphragm means preventing passage of liquid from the receptacle to said bearing means.

2. A support bearing as defined in claim 1, wherein said housing comprises two releasable parts; and further including clamping ring means for releasably securing said flexible diaphragm means to said stationary sealing ring, said clamping ring means engaging in a depression at the circumference of said stationary sealing ring; and means for clamping the outside of said flexible diaphragm means between said two releasable parts of said housing.

3. A support bearing as defined in claim 1, wherein the shaft stub defines a shoulder and wherein a disc means is releasably secured to the shaft stub at the end thereof, said bearing means comprising a ball bearing having an inside ball race disposed between the shoulder of the shaft stub and said disc means.

4. A support bearing as defined in claim 3, wherein said bearing means further comprises an outside ball race, and wherein said cup-like housing means comprises a housing member adapted to be slid onto said outside ball race, said housing member defining a flange portion and being releasably secured to the receptacle wall; said cup-like housing means further comprising a centering ring disposed between said flange portion of said housing member and the receptacle wall, said flexible diaphragm means, at the outside rim thereof, being clamped between said housing member and said centering ring.

5. A support bearing as defined in claim 1, wherein said means for fixedly mounting said rotatable sealing ring on the shaft stub for rotation therewith comprises a support ring member encircling the shaft stub and rotatable therewith in the area of penetration of the shaft stub through the opening in the receptacle wall, said rotatable sealing ring being secured to said support ring member.

6. A support bearing as defined in claim 5, wherein said support ring member encircles the shaft stub with a predetermined clearance, and wherein an O-ring means is disposed between said support ring member and the shaft stub as a secondary sealing means for the support bearing, said O-ring means sealing off the space between said support ring member and the shaft stub.

7. A support bearing as defined in claim 6, wherein said support ring abuts against the shaft stub at a shoulder thereof; and wherein said means for pressing said stationary sealing ring and its sealing surface against the associated sealing surface of said rotatable sealing ring and thus also said support ring member which carries said rotatable sealing ring against the shoulder stop of the shaft stub comprises a helical compression spring means; a ring means for supporting said helical compression spring means positioned from said bearing means; said ring means centering said helical compression spring means relative to the shaft stub as well as centering said stationary sealing ring relative to the shaft stub and said rotatable sealing ring.

References Cited
UNITED STATES PATENTS

| | | | |
|---|---|---|---|
| 926,803 | 7/1909 | Braddock | 308—36.2 |
| 2,080,403 | 5/1937 | Homan | 277—88 |
| 2,100,220 | 11/1937 | King | 277—88 |
| 2,163,127 | 6/1939 | Limpert | 277—90 |
| 2,189,197 | 2/1940 | Cerny | 308—187.1 |
| 2,270,811 | 1/1942 | Leonard | 277—90X |
| 2,592,648 | 4/1952 | Kayser | 308—187.1 |
| 2,919,148 | 12/1959 | Smith | 308—187.1 |
| 3,311,430 | 3/1967 | Christensen | 308—187.1 |

FRED C. MATTERN, JR., Primary Examiner